United States Patent Office 3,373,078
Patented Mar. 12, 1968

3,373,078
LAMINATES HAVING AN ADHESIVE COMPOSITION CONTAINING AN OXIDIZED POLYETHYLENE AND A RUBBERY TERPOLYMER
Thomas E. Ferington, Sandy Spring, Md., assignor to W. R. Grace & Co., New York, N.Y., a corporation of Connecticut
No Drawing. Filed Dec. 17, 1964, Ser. No. 419,238
16 Claims. (Cl. 161—217)

This invention relates to new compositions of matter and to articles of manufacture made by using the same. More specifically, the present invention relates to new adhesive compositions and to laminated articles prepared by use of these compositions.

There is currently an increasing need for new adhesive compositions. Of special interest are high-strength metal adhesives which are resistant to hydrolysis, resistant to oxidation and resistant to thermal degradation. Many adhesive compositions based on synthetic polymeric materials are known to the art. Each suffers from one or more disadvantages depending upon the particular application to which they are to be put. Many require the use of a primer coat on the material to be adhered. Others require the use of curing or vulcanization agents in order to obtain a useful product. And, in the latter case, special precautions are often necessary to preclude curing or setting of the composition in such a short period of time that its practical utility is almost nil. Further, many of the known compositions used as adhesives and based upon synthetic polymeric materials are so costly that their utility is restricted to very special areas where high cost can be justified.

It is an object of this invention to provide novel, low-cost adhesive compositions especially adapted for lamination of superimposed metal sheets.

It is a specific object of this invention to provide novel adhesive compositions having long shelf and pot life since no curing or vulcanizing agents are required.

Still another object of this invention is to provide adhesive compositions having good corrosion resistance, good resistance to impact, and comparatively very low cost.

Other objects and advantages of the invention will be apparent from the following detailed description thereof. It has now been found that the above and other objects are achieved by adhesive compositions consisting essentially of normally solid rubbery terpolymers of ethylene, propylene and nonconjugated hydrocarbon dienes; mixed with normally solid, oxidized, linear polyethylenes having certain properties more fully specified hereinafter, and with a hard clay.

The laminated products according to this invention comprise superimposed layers of metal sheet each of which layers is directly adhered to an intervening layer consisting essentially of the above adhesive compositions.

The rubbery ethylene-propylene-nonconjugated diene terpolymers used in the practice of this invention are materials known to the art. Their properties and the method by which they are prepared are quite fully described in, for example, U.S. Patent 2,933,480, (Apr. 19, 1960), U.S. Patent 3,000,866 (Sept. 19, 1961), U.S. Patent 3,093,621 (June 11, 1963), and Canadian Patent No. 690,420 (issued July 7, 1964). For the sake of completeness, each of these patents is hereby incorporated herein by reference thereto. Since these patents fully describe the terpolymers used in the practice of this invention, it is not considered necessary to more fully describe them herein. It should, however, be pointed out that from among the numerous terpolymers disclosed by these patents, this invention utilizes only those in which the second mono-olefin moiety is propylene. Further, it should be pointed out that it is preferred for the purposes of the present invention to use those terpolymers wherein the nonconjugated diene moiety is either 1,4-hexadiene or dicyclopentadiene. It is to be emphasized, however, that any ethylene-propylene-nonconjugated diene terpolymer disclosed by any of the above patents can be used in the practice of the present invention, if desired.

The oxidized, linear polyethylenes used in the practice of this invention are those having a density of from about 0.937 to about 1.050 grams per cubic centimeter, a crystalline melting point of from about 125° to about 135° centigrade, a melt index of from about 0.1 to about 50, a carbonyl content of from about 0.2 to about 7.5 percent by weight and an oxygen functionality index greater than about 0.03. The densities of the oxidized, linear polyethylene referred to herein are those determined in accordance with ASTMD 1505–57 T. The crystalline melting points are those temperatures at which birefringence disappears from a sample of the polymer when viewed through crossed Nicol prisms in a hot-stage microscope heated at a rate of about 1° centigrade per minute. Melt indices are those determined in accordance with the procedures described in ASTMD 1238–57 T. The corbonyl contents of the oxidized, linear polyethylenes used in the practice of this invention are those determined by measuring the intensity of infrared absorption at 1720 reciprocal centimeters, assuming an absorbance characteristic of ketone-type carbonyl. Determinations are conveniently made on a Perkin-Elmer spectrophotometer Model 221, and percent carbonyl is defined as:

$$\frac{\text{grams C=O}}{\text{grams polymer}} \times 100$$

The term "oxygen functionality index" as used herein is equal to the weight percent carbonyl of the oxidized, linear polyethylene divided by the square root of the melt index of the same material. The term "polyethylene" as used herein is meant to include both ethylene homopolymers and copolymers of ethylene with propylene or butene-1 in minor amounts. These polymers, per se, are known to the art and are in fact commercially available materials.

The oxidized, linear polyethylenes used in the practice of this invention are also known to the art. Numerous examples of such products and a particular method for preparing the same are quite fully described in U.S. Patent 3,153,025 (Oct. 13, 1964), the entire disclosure of which is hereby incorporated herein by reference. Still other oxidized, linear polyethylenes suitable for the practice of this invention as well as other methods for preparing them are fully described in copending, co-assigned United States patent application Ser. No. 317,054, filed Oct. 17, 1963 and now abandoned. The entire disclosure of this copending application Ser. No. 317,054 is also incorporated herein by reference thereto. Of those oxidized, linear polyethylenes described in the above copending, co-assigned application and in U.S. Patent 3,153,025, it is preferred for the purposes of the present invention to use those having carbonyl contents of at least about 0.3 weight percent and most preferably those in which the carbonyl content is greater than about 0.5 weight percent. In general, the higher the carbonyl content, the greater the adhesive power of the compositions of this invention.

The clay used in the compositions of this invention must be a "hard" clay. The term "hard" clay is a term well known to those skilled in the art. For a better understanding of this term reference is made to Kirk-Othmer Encyclopedia of Chemical Technology, vol. 4 (1954), at pages 71–78, the entire disclosure of which is incorporated herein by reference thereto. Further reference may also be made to the aforementioned Canadian Patent 690,420, at pages 6–10. The preferred clay for the purposes of the present invention is commercially available Suprex clay, the properties of which are fully described at page 30 of the said Canadian patent.

In the novel adhesive compositions of this invention, the oxidized, linear polyethylene component is used in amounts of from about 15 to about 105, and preferably from about 20 to about 50 parts by weight per 100 parts by weight of the rubbery ethylene-propylene-nonconjugated diene terpolymer. The hard clay is used in amounts of from about 30 to about 120 parts, and preferably from about 70 to about 100 parts by weight per 100 parts by weight of said rubbery terpolymer.

The adhesive compositions of this invention are readily prepared by thoroughly mixing the desired ingredients in any suitable manner, e.g., in a Brabender Plastograph or other similar mixing device such as a Banbury, two roll mill, extruder or the like, at temperatures ranging upwards from about the softening point of the rubbery terpolymer and the oxidized, linear polyethylene components. The exact temperature and duration of mixing are not critical in any sense so long as no thermal decomposition occurs and a substantially homogeneous admixture results. After cooling to about room temperature, the final product can be recovered and used in massive or chunk form, or may, if desired, be sheeted and/or extruded and optionally granulated and then used in any of these forms.

In preparing laminates with the adhesive compositions of the invention it is usually best, for optimum results, to preliminarily clean the metal surfaces to be bonded. This is quite readily done in conventional manner by washing or wiping with a solvent such as carbon tetrachloride, and then drying the wiped or washed surface. A suitable portion of the adhesive composition is then placed between the surfaces to be bonded and heat and pressure are applied to the assembly for a short period of time to form the laminated product. Laminating temperatures are not particularly critical, so long as the composition is heated to about its softening point or higher. Suitable temperatures are in the range of from about 150° up to about 200° centigrade or higher, but below any temperature at which decomposition might take place. Pressures ranging from about 250 up to 500 pounds per square inch or higher have been found to provide quite satisfactory laminates. The time required for preparing a laminate may range from about one minute to about 10 or 15 minutes or more depending upon the particular temperature and pressure chosen in any specific case. On cooling of the laminated assembly, it will be found that a very firm adhesive bond has been formed directly between the compositions of this invention and the metal surfaces with which the composition is in contact.

The invention is illustrated by the following specific, but non-limiting, examples. In each example, parts referred to are parts by weight, unless otherwise specifically indicated. In all examples the clay used was Suprex clay, a hard clay commercially available from the J. M. Huber Corporation. The ethylene-propylene-diene rubbery terpolymer was a commercially available material sold under the trade name "Nordel" by E. I. du Pont de Nemours & Co. The oxidized polyethylenes were prepared in accordance with the disclosure of the aforementioned copending, co-assigned U.S. application Ser. No. 317,054 and now abandoned. In all cases the adhesive compositions were prepared by blending the specified ingredients in the proportions noted in a Brabender Plastograph at a temperature of 135° centigrade for 10 to 15 minutes.

In preparing laminates the metal sheets used were in each case preliminarily cleaned by washing with carbon tetrachloride and then thoroughly dried. Laminates were prepared from tin-plated steel of the type normally used in the fabrication of tin cans for food packaging, and from all-aluminum strips. The metal strips used were 1 inch wide, 3 inches long and .020 inch (20 mils) thick (in the case of aluminum); and .010 inch (10 mils) thick (in the case of tin-plated steel). The laminates were prepared by pressing the assembly at a temperature of 350° Fahrenheit and a pressure of 500 pounds per square inch for 10 minutes, followed by cooling to about room temperature. In each laminate the final thickness of the intervening adhesive film layer was approximately .003 inch (3 mils) thick. In the tin coated steel laminates the intervening adhesive layer was adhered to the tin surfaces of the strips.

The peel strength adhesion results noted in the examples were determined in the following manner. The strips to be laminated were bent at an angle of about 90° at a distance of from 1 to 1½ inches from one of the ends. Laminated structures in the form of a T were formed from pairs of these strips. After cooling to room temperature, the arms of the T (that is, the free ends of each of the laminated strips) were placed in the jaws of an Instron tensile tester and pulled in opposite direction at a pull rate of 1 inch per minute. The force (in pounds per linear inch) required to separate the laminated sandwich is determined by use of a strain gauge and is designated the peel strength of the adhesive. In each case two strength values are reported, the first indicating the peel strength at the commencement of the test, and the last representing the peel strength just prior to separation of the laminate. Each of these values represents an average of two results performed on duplicate samples.

*Example I*

The ethylene-propylene-nonconjugated diene terpolymer used in this example was a commercially available material sold under the name Nordel. The oxidized linear polyethylene was prepared from an ethylene homopolymer in accordance with the procedures described in the above-mentioned copending, coassigned U.S. patent application Ser. No. 317,054. The oxidized linear polyethylene had a carbonyl content of 0.3 weight percent and a melt index of 0.2. Thus, the oxygen functionality index was 0.67. The hard clay used was a commercially available material sold under the name "Suprex." The following recipe was used.

| Ingredient: | Parts |
| --- | --- |
| Rubbery terpolymer | 100 |
| Oxidized polyethylene | 29 |
| Clay | 76 |

The above-named ingredients in the amounts noted were masticated in a Brabender Plastograph at 135° centigrade for 13 minutes to form a substantially homogeneous admixture. Peel strength adhesion test samples as described above were then prepared by pressing for 10 minutes at 350° Fahrenheit and cooling to room temperature. In each test specimen the thickness of the adhesive layer in the laminate was .003 inch (3 mils). Peel strength test results are shown in the following table:

| Metal Subtrate | Peel Strength (pounds per linear inch) | |
| --- | --- | --- |
| | Initial | Final |
| Aluminum | 7.9 | 1.5 |
| Tin (as steel coating) | 16.8 | 5.8 |

*Examples II–VIII*

In the following examples the ethylene-propylene-nonconjugated diene rubbery terpolymer was the same as that used in Example I. In Example II the oxidized, linear polyethylene was prepared as described above. It (the oxidized product) had a melt index of 44; a carbonyl content of 1.8 weight percent; and an oxygen functionality index of 0.27. The oxidized, linear polyethylene used in Examples III–VIII was prepared in the same manner. It had a melt index of 6.0, and a carbonyl content of 1.6 weight percent, and an oxygen functionality index of .65.

In all examples the hard clay used was commercially available Suprex clay. The recipes used and the peel strength test results are shown in the following table:

| Example | Amount of Oxidized Polyethylene (per 100 parts Rubbery Terpolymer) | Amount of Hard Clay (per 100 parts Rubbery Terpolymer) | Peel Strength (pounds per linear inch) | | | | | | | |
|---|---|---|---|---|---|---|---|---|---|---|
| | | | Aluminum | | | | Tin | | | |
| | | | Initial | Middle | Final | Average | Initial | Middle | Final | Average |
| II | 29 | 76 | 22.7 | | 8.4 | 15.6 | 20.6 | | 7.8 | 14.2 |
| III | 100 | 116 | 6.4 | 5.0 | 2.9 | 4.8 | 3.6 | 8.25 | 4.47 | 5.4 |
| IV | 65 | 98 | 7.03 | 7.37 | 4.3 | 6.2 | 3.4 | 12.2 | 5.15 | 7.1 |
| V | 41 | 83 | 8.7 | 16.5 | 6.0 | 10.4 | 5.1 | 16.2 | 5.4 | 8.9 |
| VI | 29 | 76 | 9.5 | 21.6 | 8.0 | 13.0 | 5.8 | 14.6 | 7.0 | 9.1 |
| VII | 29 | 33 | 7.5 | 22.8 | 10.5 | 13.6 | 5.0 | 18.7 | 8.3 | 10.6 |
| VIII | 18 | 70 | 6.7 | | 14.8 | 10.8 | 5.2 | | 5.4 | 5.3 |

The preceding description by necessity has been quite detailed. It is to be understood that the invention should be limited only by the scope of the appended claims.

What is claimed is:

1. Adhesive composition consisting essentially of:
   (a) a normally solid rubbery terpolymer of ethylene, propylene and a nonconjugated hydrocarbon diene;
   (b) for each 100 parts by weight of said terpolymer, from about 15 to about 105 parts by weight of a normally solid oxidized, linear polyethylene having a density of from about 0.937 to about 1.050 grams per cubic centimeter, a crystalline melting point of from about 125° to about 135° centigrade, a melt index of from about 0.1 to about 50, a carbonyl content of from about 0.2 to about 7.5 percent by weight, and an oxygen functionality index greater than about 0.03; and
   (c) for each of 100 parts by weight of said terpolymer, from about 30 to about 120 parts by weight of a hard clay.

2. Composition as defined in claim 1 containing from about 20 to about 50 parts by weight of said oxidized linear polyethylene.

3. Composition as defined in claim 1 containing from about 7 to about 100 parts by weight of said hard clay.

4. Composition as defined in claim 1 wherein said rubbery terpolymer is a terpolymer of ethylene, propylene and 1,4-hexadiene.

5. Composition as defined in claim 1 wherein said rubbery terpolymer is a terpolymer of ethylene, propylene and dicyclopentadiene.

6. Composition as defined in claim 1 wherein said oxidized linear polyethylene has a carbonyl content greater than about 0.3 weight percent.

7. Composition as defined in claim 1 wherein said oxidized, linear polyethylene has a carbonyl content greater than about 0.5 weight percent.

8. Adhesive composition consisting essentially of:
   (a) a normally solid rubbery terpolymer of ethylene, propylene and a nonconjugated hydrocarbon diene selected from the group consisting of 1,4-hexadiene and dicyclopentadiene;
   (b) for each 100 parts by weight of said terpolymer, from about 20 to about 50 parts by weight of a normally solid oxidized, linear polyethylene having a density of from about 0.937 to about 1.050 grams per cubic centimeter, a crystalline melting point of from about 125° to about 135° centigrade, a melt index of from about 0.1 to about 50, a carbonyl content of from about 0.5 to about 7.5 percent by weight, and an oxygen functionality index greater than about 0.03; and
   (c) for each 100 parts by weight of said terpolymer, from about 70 to about 100 parts by weight of a hard clay.

9. Laminate comprising superimposed layers of metal sheet each of which is directly adhered to an intervening layer consisting essentially of an adhesive composition as defined in claim 1.

10. Laminate comprising superimposed layers of metal sheet each of which is directly adhered to an intervening layer consisting essentially of an adhesive composition as defined in claim 2.

11. Laminate comprising superimposed layers of metal sheet each of which is directly adhered to an intervening layer consisting essentially of an adhesive composition as defined in claim 3.

12. Laminate comprising superimposed layers of metal sheet each of which is directly adhered to an intervening layer consisting essentially of an adhesive composition as defined in claim 6.

13. Laminate comprising superimposed layers of metal sheet each of which is directly adhered to an intervening layer consisting essentially of an adhesive composition as defined in claim 7.

14. Laminate comprising superimposed layers of metal sheet each of which is directly adhered to an intervening layer consisting essentially of an adhesive composition as defined claim 8.

15. Laminate as defined in claim 14 wherein the metal sheet layers are each composed of aluminum.

16. Laminate as defined in claim 14 wherein the superimposed metal sheet layers are each composed of tin-coated steel and wherein the tin surfaces of said sheets are bonded to the intervening adhesive layer.

References Cited

UNITED STATES PATENTS

| | | | |
|---|---|---|---|
| 3,137,745 | 6/1964 | Johnstone | 260—94.9 |
| 3,177,193 | 4/1965 | Scott | 260—94.9 |
| 3,261,889 | 7/1966 | Van Wout | 260—897 |
| 3,299,181 | 1/1967 | Coover et al. | 260—897 |

ROBERT F. BURNETT, *Primary Examiner.*

R. J. ROCHE, *Assistant Examiner.*